Figure 1:
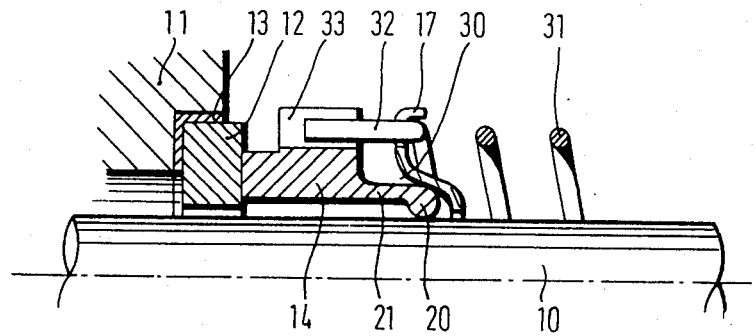

Patent Number: 4,463,958
Date of Patent: Aug. 7, 1984

United States Patent [19]
Butler

[54] MECHANICAL FACE SEALS
[75] Inventor: Stanley A. Butler, Burnham, England
[73] Assignee: Crane Packing Limited, Slough, England
[21] Appl. No.: 460,888
[22] Filed: Jan. 25, 1983
[30] Foreign Application Priority Data
Jan. 28, 1982 [GB] United Kingdom ............ 8202404
[51] Int. Cl.³ ............................................ F16J 15/34
[52] U.S. Cl. ........................................ 277/84; 277/87
[58] Field of Search .............. 277/85, 87, 84, 93 SD
[56] References Cited
U.S. PATENT DOCUMENTS
2,607,615 8/1952 Katcher ............................ 277/87
3,014,742 12/1961 Mayer ............................... 277/85
3,578,803 5/1971 Huhn ................................ 277/85

Primary Examiner—Robert I. Smith
Attorney, Agent, or Firm—Kemon & Estabrook

[57] ABSTRACT

A mechanical face seal comprises a seat associated with one of a pair of relatively rotatable components and a seal face member associated with the other component and movable axially with respect thereto. Said seal face member has a sealing face which engages an opposed face of the seat to provide a seal therebetween, and an integral secondary sealing means remote from said face. Means is provided to urge the seal face member axially into sealing engagement with the seat and the secondary sealing means radially into sealing engagement with the component associated with the seal face member.

13 Claims, 2 Drawing Figures

MECHANICAL FACE SEALS

This invention relates to a mechanical face seal for providing a seal between a pair of relatively rotatable components, for example a pump drive shaft and the pump housing.

A typical mechanical face seal comprises a seat associated with one of a pair of relatively rotatable components and a seal face member associated with the other component, said seal face member being urged towards the seat, so that opposed surfaces of the seal face member and seat are held in sealing engagement. In this form of seal, the seat is in fixed relationship to its associated component and may be effectively sealed thereto by means of a suitable gasket, which is clamped between the seat and its associated component. However, in order that the seal face member may be urged into sealing engagement with the seat and also to allow for wear of the sealing faces of the seal face member and the seat, the seal face member must be mounted slidably with respect to its associated component. The seal face member must accordingly be provided with secondary sealing means, by which it is sealed to its associated component, this secondary sealing means permitting relative axial movement between the seal face member and its associated component.

The most convenient method of providing this secondary sealing means, is by the use of an elastomeric O-ring positioned, in a retaining recess, between the seal face member and its associated component. The drawback to this form of secondary seal, is that there are two potential leakage paths, one between the seal face member and the O-ring and the other between the component and the O-ring. As a consequence, unless the surfaces of the component and the seal face member are in good condition, it is difficult to maintain a fluid tight seal by this means. This problem may be overcome by the use of flexible bellows or diaphrams, however such solutions are relatively expensive and may furthermore place a limitation on the amount of seal face wear that can be accommodated.

According to one aspect of the present invention, a mechanical face seal comprises., a seat member associated with one of a pair of relatively rotatable components., a seal face member associated with the other component, said seal face member having secondary sealing means integral therewith., and means to urge the seal face member into sealing engagement with the seat and to maintain the secondary sealing means in sealing engagement with the component associated with the seal face member, in order to provide a fluid tight seal between the seal face member and its associated component.

By forming the secondary sealing means of the seal face member integrally with the seal face member, a relatively inexpensive seal may be provided with only one potential leakage path at the secondary sealing means.

The integral seal face member/secondary sealing means may be formed as a one part fluid tight member from a material which is suitable for both purposes, such as PTFE. Alternatively, the seal face member and secondary sealing means may be formed separately and secured together to form a fluid tight assembly, for example by means of bonding. Where the seal face member and secondary sealing means are formed separately, they may of course be formed from the same material, but advantage may be taken of this form of construction, to form the portions from disimilar materials, each particularly suited for the purpose it is to serve. For example, the seal face member may be made of a relatively rigid material such as a graphite or sintered refractory material and the secondary sealing means may be made of an elastomeric material such as rubber.

In a preferred embodiment, a thrust ring is arranged to urge the face seal member axially into sealing engagement with the seat and the secondary sealing means radially into sealing engagement with the associated component. The thrust ring may be provided with an inclined surface which engages the secondary sealing means to apply axial and radial forces thereto.

Figure 2:
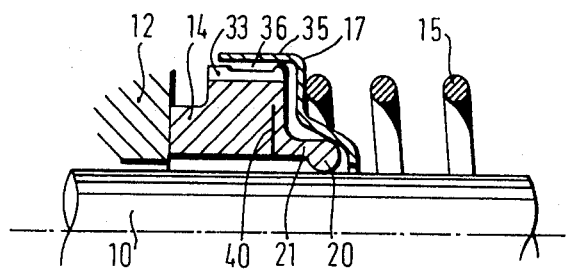

Several embodiments of the present invention are now described by way of example only, with reference to the accompanying drawings, in which:

FIG. 1 illustrates a mechanical face seal formed in accordance with the present invention., and FIG. 2 illustrates a modification of the seal illustrated in FIG. 1.

FIG. 1 illustrates a mechanical face seal which provides a seal between a rotatable shaft 10 and a housing 11. The seal comprises a seat 12 which is mounted in a recessed portion of the housing 11 and is sealed thereto by means of gasket 13. A seal face member 14 is slidingly located about the shaft 10 and is forced into sealing engagement with the seat 12, by means of a thrust ring 17, which is urged by a compression spring 15, axially towards the seat 12.

The seal face member 14 is provided with secondary sealing means in the form of an O-ring portion 20 which is connected to the rear face of the seal face member 14, by means of a radially flexible web portion 21. The seal face member 14, O-ring portion 20 and web portion 21 are made of PTFE and are of homogoneous construction, the web portion 21 being relatively rigid in the axial direction. The thrust ring 17 has a conical surface 30 which abuts against the O-ring portion 20, to apply an axial load to the seal face member 14. As the surface 30 of the thrust ring 17 is inclined, it will also apply a radial load to the O-ring portion 20, to force this portion into sealing engagement with the shaft 10. The secondary sealing means of the seal face member 14 is thus maintained under a constant resilient loading, which is particularly suitable where the secondary sealing means is formed from PTFE, which is subject to creep and compression set with a very slow recovery rate. The ratio of the axial to radial load applied by the spring may be controlled by selection of appropriate conical shape and proportions of the retaining ring 17, so that the ratio is appropriate for the operating conditions of the seal.

In this embodiment the spring 31 has a hook portion 32 which extends through a slot in the thrust ring 17, to engage in a groove 33 in the seal face member 14, so that rotation of the shaft 10 may be transmitted to the seal face member 14. An alternative method of transmitting the drive to the seal face member 14, is illustrated in FIG. 2. In this modification, a conventional coil spring 15 is used to apply an axial load to the thrust ring 17. The thrust ring 17 is provided with a cylindrical flange 35 which surrounds the seal face member 14, this cylindrical flange being provided with a dimple 36 which engages the groove 33, in the seal face member 14.

In the seals illustrated in FIGS. 1 and 2, the axial load is transmitted through the web portion 21, this portion may if necessary be reinforced by for example, surrounding it with a metal reinforcing ring. It is however desirable that there is some flexibility in the web portion 21, so that in the event that the O-ring portion becomes stuck to the shaft, the sealing faces of the seat 12 and seal face member 14 may still remain in sealing engagement. One method of achieving this whilst keeping the web portion 21 sufficiently rigid to transmit the axial load, is to form a radial slit 40 in the rear portion of the seal face member 17, as illustrated in FIG. 2. By this means, if the O-ring portion 20 becomes stuck to the shaft 10, the pressure of fluid on the internal diameter of the seal face member 14 will open the slit 40, so that the sealing faces may remain in engagement.

As described above the present invention provides a secondary sealing means for mechanical face seal, having . all the advantages of the conventional O-ring seal; for example simplicity and unrestricted axial movement in order to compensate for wear in the primary sealing faces., and with improved sealing performance, as a result of the reduction of potential leakage paths and the ability to provide positive loading of the secondary sealing means.

Various modifications may be made without departing from the invention, for example, although in the embodiment, described, the secondary sealing means incorporates a portion of substantially O-ring configuration, other shapes may be used in conjunction with a suitably shaped thrust ring.

I claim:

1. A mechanical face seal comprising:
   a seat member associated with one of a pair of relatively rotatable components;
   a seal face member associated with the other component, said seal face member having a secondary sealing means formed integrally therewith, the secondary sealing means comprising a sealing formation which is connected to the seal face member by a relatively flexible web portion;
   means which acts against the sealing formation of the secondary sealing means to apply;
   an axially compressive load to the web portion and thereby urge the seal face member into sealing engagement with the seat; and
   a radial load to urge the sealing formation into sealing engagement with the seal face member and thereby provide a fluid tight seal between the seal face member and its associated component.

2. A mechanical face seal according to claim 1 in which a thrust ring is arranged to urge the seal face member into sealing engagement with the seat and the secondary sealing means into sealing engagement with the associated component.

3. A mechanical face seal according to claim 2 in which the thrust ring is provided with an inclined surface which engages the secondary sealing means and thereby applies an axial force urging the seal face member into sealing engagement with the seat, and a radial force urging the secondary sealing means into sealing engagement with the associated component.

4. A mechanical face seal according to claim 2 in which spring means is provided between the thrust ring and the associated component, said spring means urging the thrust ring axially towards the seat.

5. A mechanical face seal according to claim 1 in which the secondary sealing means is in the form of an O-ring which is connected to the seal face member by means of a relatively flexible web portion.

6. A mechanical face seal according to claim 5 in which the seal face member and the secondary sealing means are of monolithic construction.

7. A mechanical face seal according to claim 6 in which the seal face member and secondary sealing means are made of PTFE.

8. A mechanical face seal according to claim 5 in which the seal face member and secondary sealing means are made of dissimilar materials and are bonded together.

9. A mechanical face seal according to claim 5 in which the flexible web portion is reinforced in the axial direction.

10. A mechanical face seal according to claim 1 in which a radial slit is provided in the seal face member, said slit being between the sealing face of the seal face member and the secondary sealing means, and permits relative axial movement therebetween.

11. A mechanical face seal according to claim 1 in which location means is provided to prevent relative rotation between the seal face member and its associated component.

12. A mechanical face seal according to claim 1 in which the seal face member is urged into sealing engagement with the seat by spring means which acts between the seal face member and its associated component, said spring means engaging a formation on the seal face member, in order to prevent relative rotation between the seal face member and its associated component.

13. A mechanical face seal according to claim 11 in which a thrust ring applies an axial force to the seal face member and a radial force to the secondary sealing means, said thrust ring engaging in a corresponding formation on the seal face member, in order to prevent relative rotation between the seal face member and its associated component.

* * * * *